(12) United States Patent
Lin et al.

(10) Patent No.: US 10,031,599 B2
(45) Date of Patent: Jul. 24, 2018

(54) TOUCH PANEL HAVING SENSING STRUCTURES IN VISIBLE AND NON-VISIBLE AREAS AND FABRICATION METHOD THEREOF

(71) Applicant: TPK Touch Solutions (Xiamen) Inc., Xiamen (CN)

(72) Inventors: Yan Lin, Xiamen (CN); Tsung-Ke Chiu, Tainan (TW); Yuncong Su, Xiamen (CN); Zhuanyuan Zhang, Zhangzhou (CN); Yalu Lin, Xiamen (CN)

(*) Notice: Subject to any disclaimer, the term of this patent is extended or adjusted under 35 U.S.C. 154(b) by 5 days.

(21) Appl. No.: 15/072,364

(22) Filed: Mar. 17, 2016

(65) Prior Publication Data
US 2016/0274689 A1    Sep. 22, 2016

(30) Foreign Application Priority Data
Mar. 18, 2015 (CN) .......................... 2015 1 0116749

(51) Int. Cl.
*G06F 3/041* (2006.01)

(52) U.S. Cl.
CPC .... *G06F 3/041* (2013.01); *G06F 2203/04103* (2013.01)

(58) Field of Classification Search
CPC ........................................................ G06F 3/041
USPC ......................................................... 345/173
See application file for complete search history.

(56) References Cited

U.S. PATENT DOCUMENTS

| | | | |
|---|---|---|---|
| 2013/0168220 A1* | 7/2013 | Ho .......................... | G06F 3/044 200/600 |
| 2014/0063371 A1* | 3/2014 | Jiang ..................... | G06F 1/1692 349/12 |
| 2014/0104509 A1* | 4/2014 | Fang ....................... | G06F 3/044 349/12 |
| 2016/0266671 A1* | 9/2016 | Takahashi ............... | C03C 15/00 |

* cited by examiner

*Primary Examiner* — Long D Pham (57) ABSTRACT

A micro-light emitting diode (micro-LED) display device includes a substrate and a micro-LED. The substrate has at least one first metal layer. The micro-LED includes a light emitting structure, at least one second metal layer, at least one reflective layer, and a dielectric layer with an opening. The second metal layer forms a eutectic system or soldering contact with the first metal layer. The reflective layer is disposed between the light emitting structure and the second metal layer, and a eutectic point of the eutectic system or soldering point is lower than a melting point of the reflective layer. The dielectric layer is disposed between the light emitting structure and the reflective layer

19 Claims, 10 Drawing Sheets

TOUCH PANEL HAVING SENSING STRUCTURES IN VISIBLE AND NON-VISIBLE AREAS AND FABRICATION METHOD THEREOF

BACKGROUND OF THE INVENTION

This application claims priority to Chinese Application Serial Number 201510116749.7, filed Mar. 18, 2015, which is herein incorporated by reference.

FIELD OF INVENTION

The present disclosure relates to a touch technology. More particularly, the present disclosure relates to a touch panel and a fabrication method thereof.

DESCRIPTION OF RELATED ART

In the present market of various consumer products, touch panels have been widely applied in portable electronic products, such as smartwatches, smartphones, tablet personal computers, notebook personal computers, etc., as the human machine interface (HMI). In addition, since the present electronic products are designed to be light, thin, short, and small, the space accommodating the input device (e.g. button) on the product has become smaller and smaller. As a result, with the trend of perusing user-friendly design of the tablet personal computers, touch panels have become one of the critical components in the portable products.

A touch panel may be substantially divided to a visible area and a non-visible area. The visible area is designed to have a touch function to sense touch inputs of users, and the non-visible area provides the position for accommodating the peripheral designed lines. The non-visible area is usually opaque for preventing users from seeing the line configurations of the touch panel. As a result, the non-visible area is usually designed to have a light-shielding structure, which is not necessary for the visible area. Therefore, due to the light-shielding structure, a boundary portion of the visible area and the non-visible area usually has a rise on the surface feature. In the procedure of the patterning process, the rise on the surface feature may cause the accumulation of resists, which may block the unpatterned sensing electrodes from being etched effectively, creating an electrical short circuit among the sensing electrodes, and reducing the fabrication yield of the touch panels.

SUMMARY OF THE INVENTION

One technical aspect of the present disclosure provides a touch panel.

According to one or more embodiments of the present disclosure, the touch panel includes cover plate, shielding layer, and a first sensing structure. The cover plate has a visible area and a non-visible area, in which the non-visible area surrounds the visible area. The shielding layer is configured to define the non-visible area. The first sensing structure includes plural first sensing electrodes, and the first sensing electrodes are disposed in the visible area and at least a part of the non-visible area. Any two adjacent first sensing electrodes in the visible area have a first pitch therebetween, and any two adjacent first sensing electrodes at a boundary portion of the visible area and the non-visible area have a second pitch therebetween, in which the second pitch is greater then the first pitch.

Another technical aspect of the present disclosure provides a method for fabricating a touch panel.

The method for fabricating a touch panel includes providing a cover plate; forming a shielding layer; and forming a patterned first sensing structure. The cover plate has a visible area and a non-visible area, in which the non-visible area surrounds the visible area. The shielding layer is formed in the non-visible area. The patterned first sensing structure is formed in the visible area and at least a part of the non-visible area, in which the first sensing structure includes plural first sensing electrodes. Any two adjacent first sensing electrodes in the visible area have a first pitch therebetween, and any two adjacent first sensing electrodes at a boundary portion of the visible area and the non-visible area have a second pitch therebetween, in which the second pitch is greater then the first pitch.

A rise on the surface feature at the changing position (e.g. the boundary portion described above) may reduce the fabrication yield of the touch panel may. For example, in the procedure of forming a patterned sensing structure (including a first sensing structure and a second sensing structure), a problem of accumulation of resists may exist at the boundary portion of the visible area and the non-visible area, thereby blocking the sensing structure from being etched effectively. As a result, by designing the adjacent sensing electrodes (including a first sensing electrode and a second sensing electrode) at the boundary portion to have a larger pitch therebetween than those at the other positions, the electrical short circuit resulting from the imperfection in the etching of the sensing structure among the sensing electrodes can be prevented, thereby improving the fabrication yield rate of the touch panels.

BRIEF DESCRIPTION OF THE DRAWINGS

The disclosure can be more fully understood by reading the following detailed description of the embodiment, with reference made to the accompanying drawings as follows.

DETAILED DESCRIPTION OF THE INVENTION

The following embodiments are disclosed with accompanying diagrams for detailed description. For illustration clarity, many details of practice are explained in the following descriptions. However, it should be understood that these details of practice do not intend to limit the present disclosure. That is, these details of practice are not necessary in parts of embodiments of the present disclosure. Furthermore, for simplifying the drawings, some of the conventional structures and elements are shown with schematic illustrations.

Figure 1:
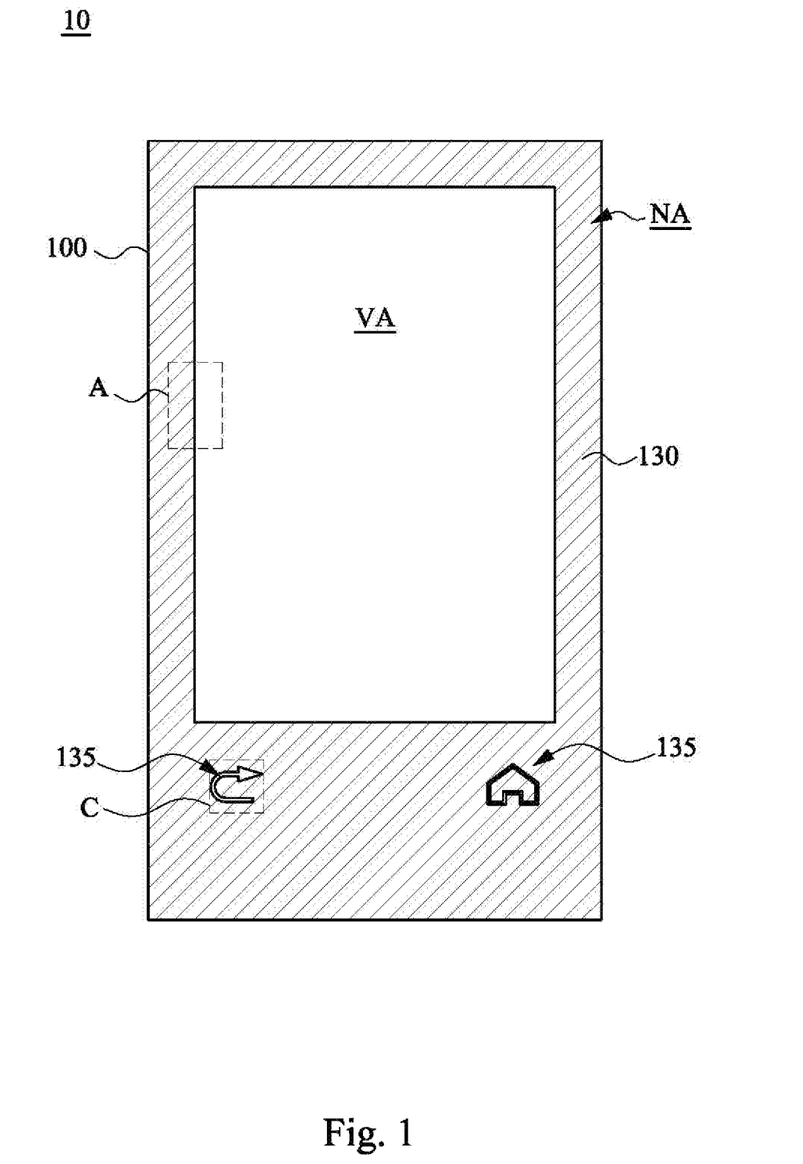
FIG. 1 is a top view of a touch panel according to an embodiment of the present disclosure.

FIG. 1 is a top view of a touch panel 10 according to an embodiment of the present disclosure. As shown in FIG. 1, the touch panel 10 includes a cover plate 100. The cover plate 100 has a visible area VA and a non-visible area NA. In the embodiment of FIG. 1, the non-visible area NA is disposed at the four sides of the visible area VA, and the non-visible area NA surrounds the visible area VA. To be specific, the touch panel 10 may include a shielding layer 130 formed on the cover plate 100. The cover plate 100 can be made of transparent materials, such as glass, polyethyleneterephthalate (PET), polycarbonate (PC), polymethylmethacrylate (PMMA), or other polymeric materials. The shielding layer 130 can be made of opaque materials, such as black photoresist, and is configured to define the non-visible area NA on the cover plate 100. That is, the shielding layer 130 is disposed in the non-visible area NA, light can not pass through the shielding layer 130, and therefore, the associated lines of the touch panel 10 can be disposed in the non-visible area NA, thereby the associated lines are prevented from being perceived by users and affecting the appearance of the displays. The edge of the shielding layer 130 can also be configured to define the non-visible area NA and the visible area VA.

Figure 2:
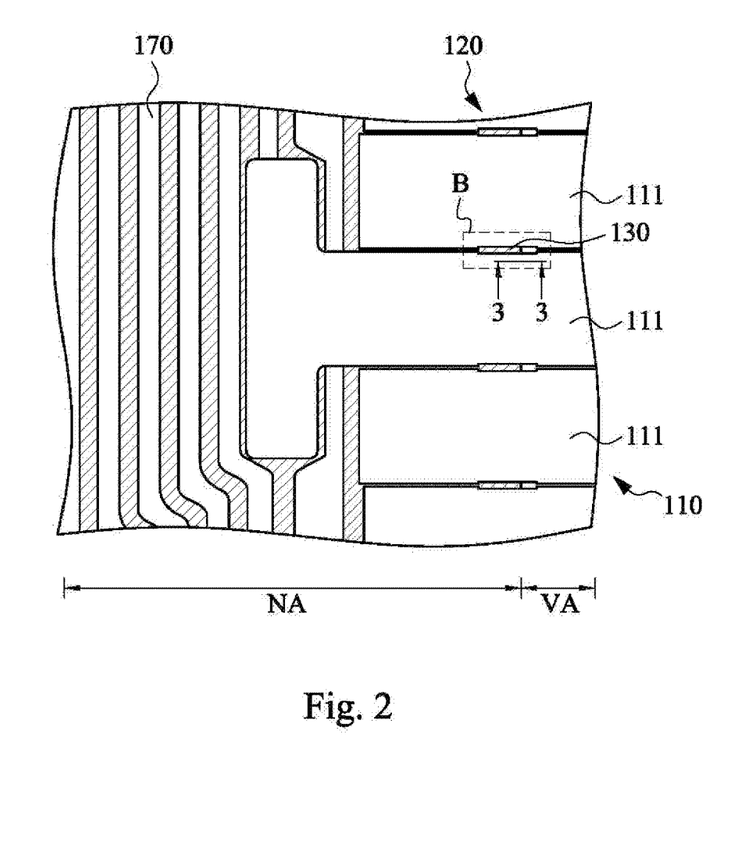
FIG. 2 is a bottom view of the region A of FIG. 1.

FIG. 2 is a bottom view of the region A of FIG. 1. As shown in figure, the touch panel 10 includes a first sensing structure 110 and at least a conductive line 170. The conductive line 170 is disposed in the non-visible area NA. The first sensing structure 110 includes plural first sensing electrodes 111, and the plural first sensing electrodes 111 are disposed in the visible area VA and at least a part of the non-visible area NA. To be specific, the first sensing electrodes 111 can be made of transparent conductive materials, and the visible area VA cab be covered by the first sensing electrodes 111 for detecting a touch input of the users. For example, in some embodiments, the plural first sensing electrodes 111 can be configured to receive a drive signal from the conductive line 170, or to transmit a detected signal to the conductive line 170. In some embodiments, the plural first sensing electrodes 111 can receive the drive signal from the conductive line 170 and then transmit the detected signal to the conductive line 170. An end of one of the first sensing electrodes 111 arranged along the same axis is crossing the visible area VA and the non-visible area NA and is electrically connected to the conductive line 170. As the embodiments shown by FIG. 2, among the first sensing electrodes 111 arranged along the same axis, an end of one of the first sensing electrodes 111 extends into the non-visible area NA and is electrically connected with the conductive line 170. As a result, sensing signals detected by the plural first sensing electrodes 111 can be transmitted to processing units (not shown) by the conductive line 170 for calculating the touch position of users.

Figure 3:
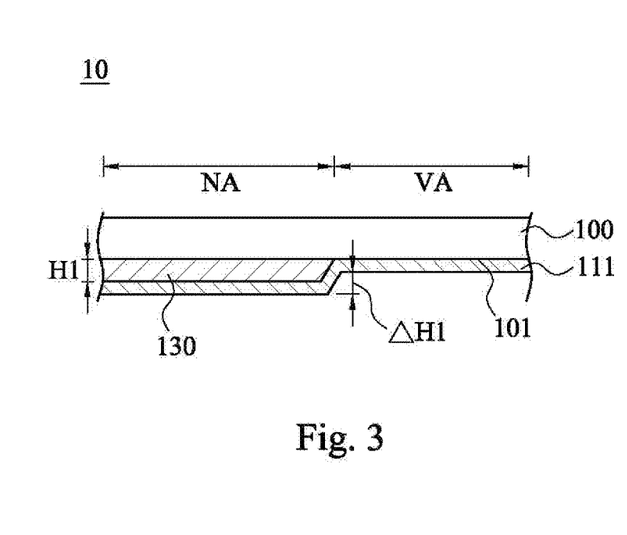
FIG. 3 is a cross-sectional view of the segment 3 of FIG. 2.

FIG. 3 is a cross-sectional view of the segment 3 of FIG. 2, in which the profile position of the FIG. 3 is crossing the visible area VA and the non-visible area NA. As shown in FIG. 3, the cover plate has a bottom surface 110, and the shielding layer 130 covers the bottom surface 110 to form the non-visible area NA of the cover plate 110. The first sensing electrodes 111 covers the bottom surface 101 of the cover plate 100 corresponding to the visible area VA, while the first sensing electrodes 111 extend to the non-visible area to cover a part of the shielding layer 130. That is, the first sensing electrodes 111 is crossing the visible area VA and the non-visible area NA for ensuring a touch input of a user at the edge of the visible area VA can also be detected by the touch panel 10. As a result, in the embodiment of FIG. 3, since the shielding layer 130 is disposed in the non-visible area NA and having a height H1, when the first sensing electrodes are crossing the visible area VA and the non-visible area NA, a rise on the surface feature is generated. In other words, there is a height difference ΔH1 between a surface of the first sensing electrodes 111 in the visible area VA and a surface of the first sensing electrodes 111 in the non-visible area NA. The height difference ΔH1 makes the fabrication yield of the touch panel 10 easily decreases. For example, in the procedure of the fabrication process of the touch panel 10, it is necessary to perform a patterning process for forming plural first sensing electrodes 111. In the procedure of the patterning process, resists are easily accumulated at the position of the height difference ΔH1, which blocks the unpatterned first sensing electrodes 111 from being etched effectively, resulting in a failure in the patterning process, and a reduction of the fabrication yield of touch panel 10.

Figure 4:
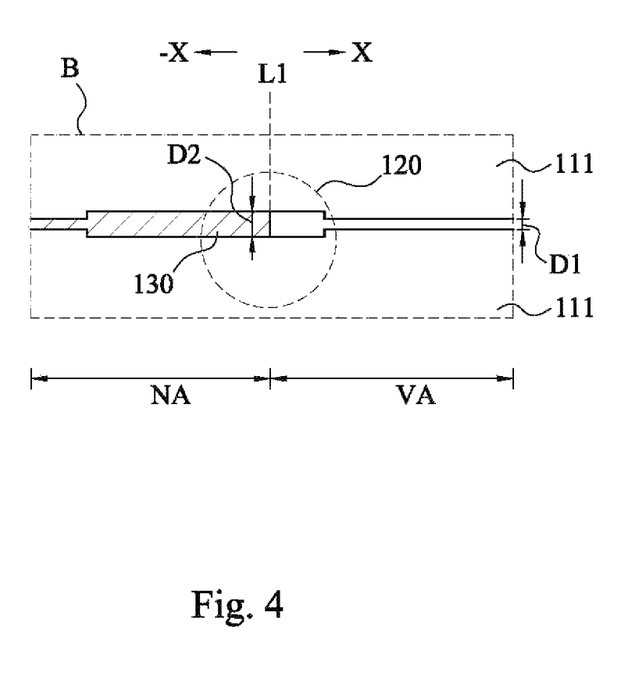
FIG. 4 is an enlarged view of the region B of FIG. 2.

FIG. 4 is an enlarged view of the region B of FIG. 2. As shown in figure, there is a boundary portion 120 between the visible area VA and the non-visible area NA. The boundary portion 120 is substantially the region from an area having no height difference ΔH1 to an area having the height difference ΔH1, and also referred to the region where the rise on the surface feature of the first sensing electrodes 111 of is located. Viewing from the etching line (between the first sensing electrodes 111), the boundary portion 120 is substantially at the position of an edge L1 of shielding layer 130. In some embodiments, the edge L1 of the shielding layer 130 is taken as a centerline, the boundary portion 120 includes a range extending a determined distance (e. g. 0.4, 0.5, or 0.6 millimeter) toward two opposite sides (toward the center of the cover plate 100 and the edge of the cover plate 110, which are the X and −X direction in FIG. 4) from the centerline. FIG. 4 depicts plural first sensing electrodes 111 that have been patterned by the patterning process, in which any two adjacent first sensing electrodes 111 in the visible area VA have a first pitch D1 therebetween, and any two adjacent first sensing electrodes 111 at a boundary portion 120 of the visible area VA and the non-visible area NA have a second pitch D2 therebetween. In the embodiment of FIG. 4, wherein the second pitch D2 is greater then the first pitch D1. Therefore, by designing the second pitch D2 to be greater than the first pitch D1, in the procedure of patterning plural first sensing electrodes 111, an incomplete etch can be prevented from occurring.

More detail, at the position of the boundary portion 120, the problem of the accumulation of resists is more serious at an edge of the second pitch D2 adjoining the first sensing electrodes 111 than that at a center of the second pitch D2. As a result, in the procedure of patterning the plural first sensing electrodes 111, if the second pitch D2 is designed to be greater than the first pitch D1, the problems of incomplete etch at the edge of the second pitch D2 adjoining the first sensing electrodes 111 can be prevented, and the resulting electrical short circuit between two adjacent first sensing electrodes 111 can be prevented from occurring.

Figure 5:
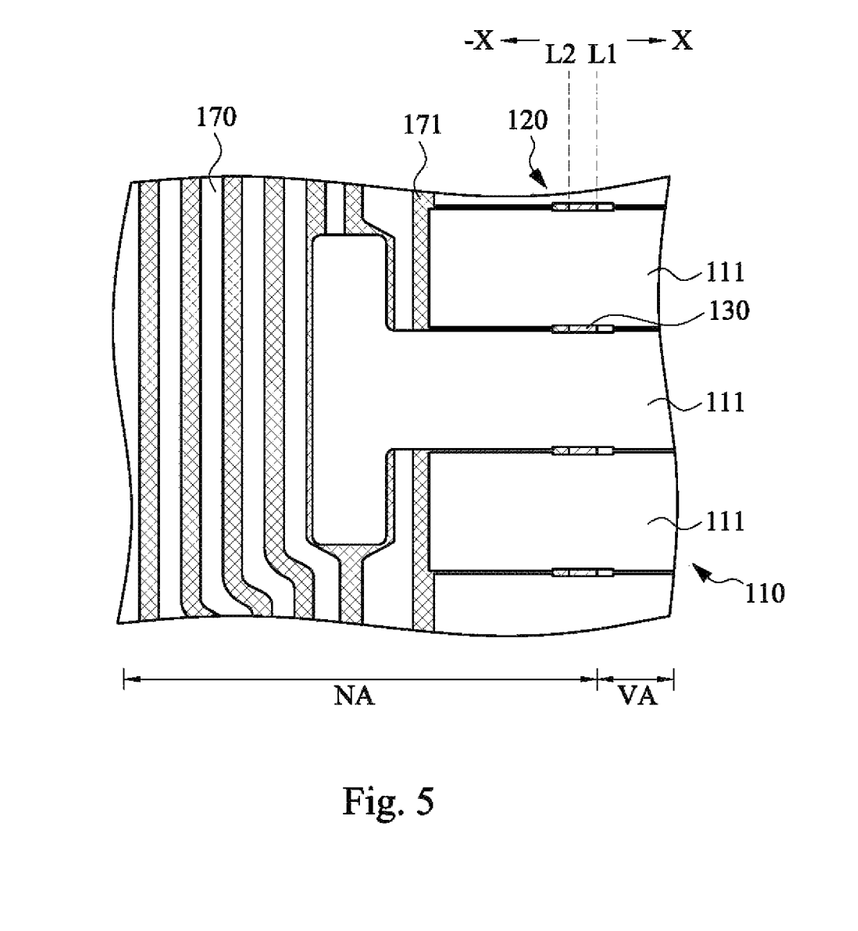
FIG. 5 is a bottom view of the region A of another embodiment of FIG. 1.

FIG. 5 is a bottom view of the region A of another embodiment of FIG. 1. FIG. 5 is similar to FIG. 2, but the difference is that in the non-visible area NA, the shielding layer 130 is disposed on the cover plate 100, the conductive line 170 is disposed on the shielding layer 130, and a insulating layer 171 is disposed on the shielding layer 130 in the area where the conductive line 170 is not disposed. The insulating layer 171 can be made of various nonconductive materials, such as polyimide (PI), silicon oxide ($SiO_2$), silicon nitride (SiN), silicon carbonitride (SiCN), silicon carbide (SiC). Therefore, when the sensing electrodes (such as the first sensing electrodes 111) are disposed, the insulating layer 171 is disposed between the shielding layer 130 and the first sensing electrodes 111, and the insulating layer 171 is also disposed between a part of the conductive line 170 and the first sensing electrodes 111, thereby preventing the sensing electrodes from being in direct contact with the conductive line 170 which the sensing electrodes is not corresponding to. In this embodiment, the boundary portion 120 includes a range from an edge of the shielding layer 130 to an edge of the insulating layer 170. In some embodiments, the boundary portion 120 can be defined as a range extending a determined distance (e. g. 0.4, 0.5, or 0.6 millimeter) in a normal direction (such as the X direction toward the center of the cover plate 100 in FIG. 5) of the edge L1 of the shielding layer 130, or extending a determined distance (e. g. 0.4, 0.5, or 0.6 millimeter) in a normal direction (such as the X direction toward the center of the cover plate 100 in FIG. 5) of the edge L2 of the insulating layer 171.

Next, referring back to FIG. 1. In the embodiment of FIG. 1, the shielding layer 130 can includes at least one hollow-out pattern 135. As shown in figure, for example, the hollow-out pattern 135 can be a pattern of a return key or a pattern of home key. In this embodiment, there are also sensing electrodes at the position of the hollow-out pattern 135. Therefore, the electronic devices utilizing the touch panel 10 of the present embodiment can totally get rid of the traditional physical button structure.

Figure 6:
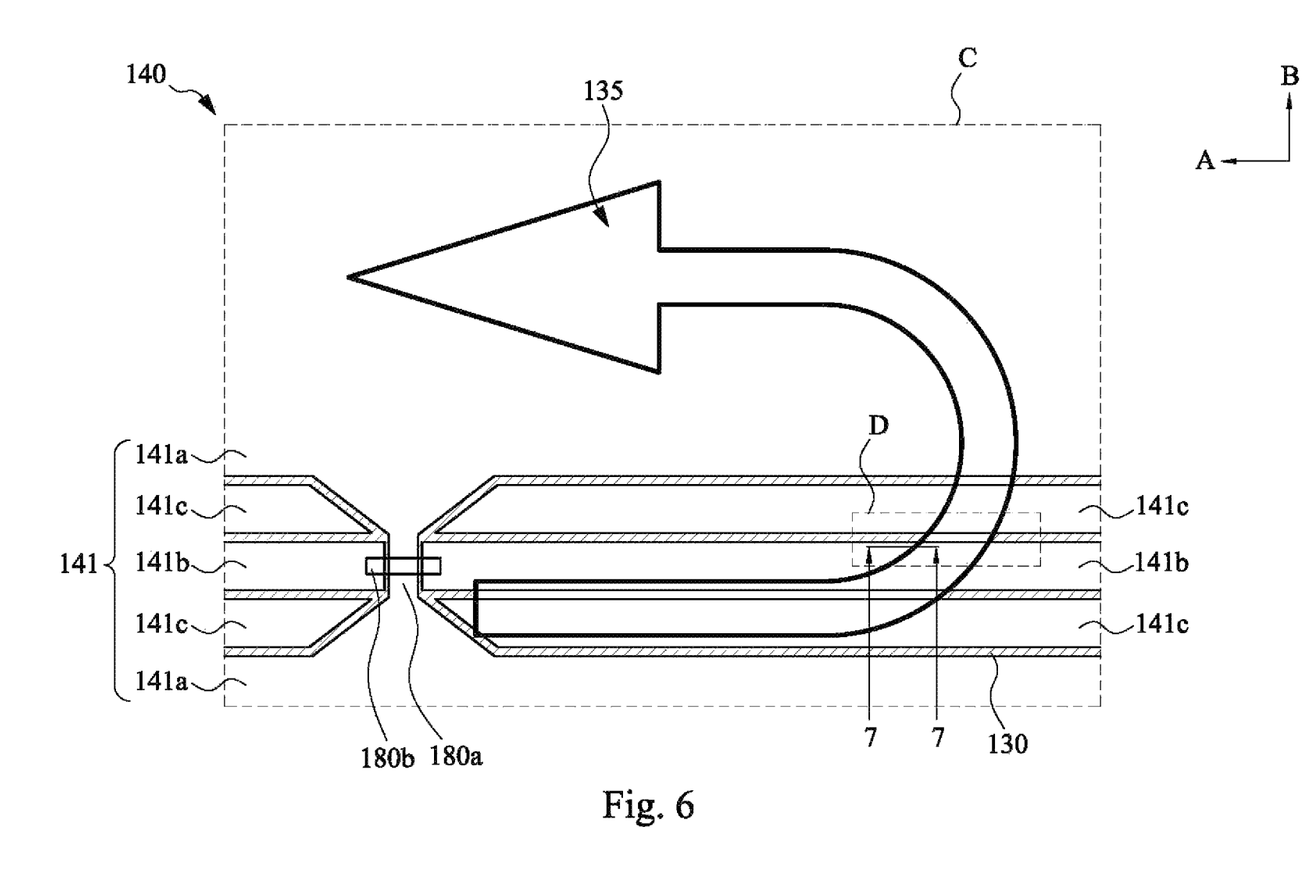
FIG. 6 is a bottom view of the region C of FIG. 1.

To be specific, referring to FIG. 6, which is a bottom view of the region C of FIG. 1. As shown in figures, the touch panel 10 can further include a second sensing structure 140. The second sensing structure 140 includes plural second sensing electrodes 141. In the embodiment of FIG. 6, the second sensing electrodes 141 are made of transparent conductive materials, and the second sensing electrodes 141 are disposed in the non-visible area NA. The second sensing electrodes 141 at least partially cover the hollow-out pattern 135. In this way, when users touch the hollow-out pattern 135 of FIG. 1, the second sensing electrodes 141 can detect a touch input of the users.

More specifically, take the embodiment of FIG. 6 as example, the plural second sensing electrodes 141 can divided into electrodes 141a, electrodes 141b, and electrodes 141c, in which the electrodes 141a can receive a drive signal from the conductive line 170, and the electrodes 141b can transmit a signal generated by the touching on the touch panel 10 to the conductive line 170; alternatively, the electrodes 141b can receive a drive signal from the conductive line 170, and the electrodes 141a can transmit a signal generated by the touching on the touch panel 10 to the conductive line 170. In some embodiments, the electrodes 141a and electrodes 141b can receive drive signals from the conductive line 170, and then transmit signals generated by the touching on the touch panel 10 to the conductive line 170. The electrodes 141c are void electrodes and configured to establish optical match between the electrodes 141a and the electrodes 141b, so that the lines of the electrodes 141a and the electrodes 141b are uneasily perceived by the naked eye. In addition, the electrodes 141c are disposed between the electrodes 141a and the electrodes 141b for preventing the crosstalk between the electrodes 141a and the electrodes 141b from influencing the sensitivity. The electrodes 141a can be mutually electrically connected along the axis A through a bridging line 180a, and the electrodes 141b can be mutually electrically connected along the axis B through a bridging line 180b, in which the bridging line 180a and the bridging line 180b are mutually isolated. It should be understood that, the patterns of the second sensing electrodes 141 are merely used as an example. In other embodiments, the second sensing electrodes 141 can have a pattern or structure known by one with ordinary skill in the art.

Figure 7:
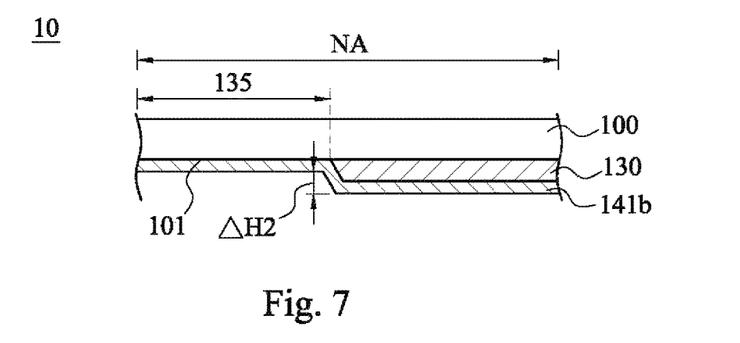
FIG. 7 is a cross-sectional view of the segment 7 of FIG. 6.

FIG. 7 is a cross-sectional view of the segment 7 of FIG. 6. Reference is now made to FIG. 6 and FIG. 7. There is no shielding layer 130 at the position of the hollow-out pattern 135 since it is in the non-visible area VA. Therefore, in the non-visible area NA, there is a height difference $\Delta H2$ between a surface of the second sensing electrodes 141 in the hollow-out pattern 135 and a surface of the second sensing electrodes 141 out of the hollow-out pattern 135. Similar to the height difference $\Delta H1$ in FIG. 3 easily blocking the first sensing electrode 111 from being etched effectively, the height difference $\Delta H2$ also easily blocks the second sensing electrode 141 from being etched effectively, and thereby reducing the fabrication yield of the touch panel 10.

Figure 8:
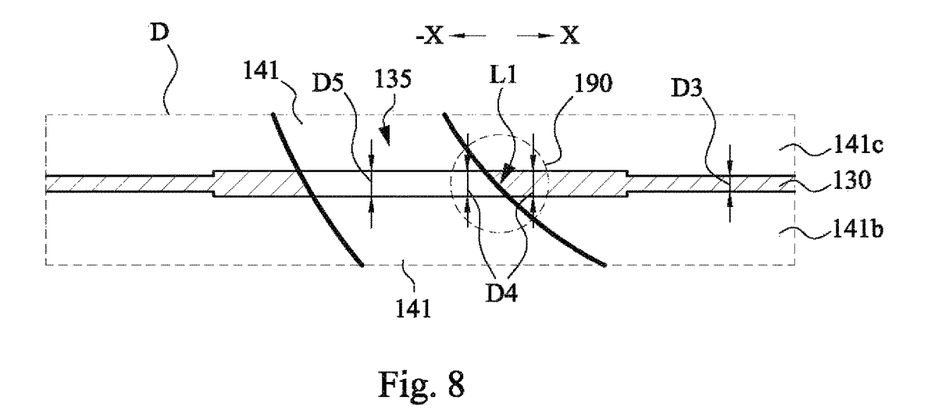
FIG. 8 is an enlarged view of the region D of FIG. 6.

FIG. 8 is an enlarged view of the region D of FIG. 6. In FIG. 8, plural second sensing electrodes 141 that have been patterned by the patterning process are depicted. As shown in figures, the hollow-out pattern 135 has an edge portion 190. The edge portion 190 of the hollow-out pattern 135 is substantially the region in FIG. 7 from an area having no height difference $\Delta H2$ to an area having the height difference $\Delta H2$, and also referred to the region where the rise on the surface feature of the second sensing electrodes 141 of is located. To be specific, the edge L1 of the shielding layer 130 is taken as a centerline, the edge portion 190 includes a range extending a determined distance (e. g. 0.4, 0.5, or 0.6 millimeter) toward two opposite sides (toward the center of the cover plate 100 and the edge of the cover plate 110, which are the X and −X direction in FIG. 8) from the centerline. In the embodiment of FIG. 8, out of the hollow-out pattern 135, any two adjacent second sensing electrodes 141 have a third pitch D3 therebetween. At the edge portion 190 of the hollow-out pattern, any two adjacent second sensing electrodes 141 have a fourth pitch D4 therebetween, wherein the fourth pitch D4 is greater then the third pitch D3. As a result, by designing the fourth pitch D4 to be greater then the third pitch D3, in the procedure of patterning plural second sensing electrodes 141, the incomplete etch can be prevented from occurring.

More detail, at the position of the edge portion 190, the problem of the accumulation of resists is more serious at the edge of the fourth pitch D4 adjoining the second sensing electrodes 141 than that at the center of the fourth pitch D4. As a result, in the procedure of patterning the plural second sensing electrodes 141, if the fourth pitch D4 is designed to be greater than the third pitch D3, the problems of incomplete etch at the edge of the fourth pitch D4 adjoining the second sensing electrodes 141 can be prevented, and the resulting electrical short circuit between two adjacent second sensing electrodes 141 can be prevented from occurring.

Referring to FIG. 8, in the hollow-out pattern 135, any two adjacent second sensing electrodes 141 have a fifth pitch D5 therebetween. In the embodiments of the present disclosure, the second sensing electrodes 141 in the hollow-out pattern 135 have less rise on the surface feature, the possibility of perceiving the etch line can be reduced when the fifth pith D5 is smaller than the fourth pitch D4, and the possibility of electrical short circuits among the electrodes can be reduced when the fifth pith D5 is greater than the third pitch D3, so the fifth pith D5 in the hollow-out pattern 135 can be designed to be greater than or equivalent to the third pitch D3, or to be equivalent to or less than the fourth pitch D4, and the patterning result of the second sensing electrodes 141 would not be influenced.

In some embodiments, a ink layer can be disposed on the second sensing structure 140 (between the second sensing structure 140 and the backlight module), and the ink layer can have colors and transmittance, so that the hollow-out pattern 135 can show corresponding colors.

Figure 9:
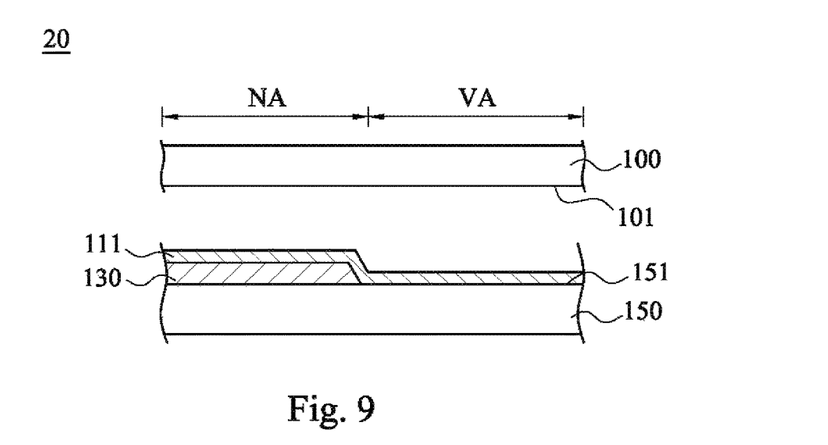
FIG. 9 is a cross-sectional view of a touch panel according to another embodiment of the present disclosure, and the profile position of FIG. 9 is the same as that of FIG. 3.

FIG. 9 is a cross-sectional view of a touch panel 20 according to another embodiment of the present disclosure, and the profile position of FIG. 9 is the same as that of FIG. 3. As shown in figure, the difference between the present embodiment and the embodiment of FIG. 3 is that, in the embodiment of FIG. 3, the first sensing electrodes 111 and the shielding layer 130 are all disposed on the cover plate 100, but in the present embodiment, the first sensing electrodes 111 and the shielding layer 130 are disposed separately from the cover plate 100. To be specific, for example, in the embodiment of FIG. 3, the touch panel 10 can be one-glass solution (OGS) touch panel, and in the embodiment of FIG. 9, the touch panel 10 can be the touch panel 20 with two layer of glass.

More specifically, in the embodiment of FIG. 9, the touch panel can further include a substrate 150. The substrate 150 can be made of transparent or opaque materials, such as glass, polyethyleneterephthalate (PET), polycarbonate (PC), polymethylmethacrylate (PMMA), or other polymeric materials. The substrate 150 can have a loading surface 151 facing a bottom surface 101 of the cover plate 100. The shielding layer 130 is disposed on at part of the loading surface 151 to form a non-visible area NA of the cover plate 100. The first sensing electrodes 111 of the first sensing structure 110 cover a part of the shielding layer 130 and the loading surface 151 corresponding to the visible area. Since the first sensing structure 110 is crossing the visible area VA and the non-visible area NA, the first sensing structure 110 have a rise on the surface feature at the boundary portion of the visible area VA and the non-visible area NA. In view of this, similar to those shown in FIG. 3, by designing the second pitch D2 greater than the first pitch D1, in the procedure of patterning plural first sensing electrodes 111, an incomplete etch can be prevented from occurring.

Similarly, in the structure of the touch panel 20 of FIG. 2, the second electrodes 141 are also formed on the loading surface 151 (not shown) of the substrate 150. Likewise, if the second sensing electrodes 141 have a rise on the surface feature, which may result in the incomplete etch, as the structure of FIG. 8, the distance between the adjacent second sensing electrodes 141 can be designed to be greater than that at a flat portion (out of the hollow-out pattern 135 of FIG. 8), thereby preventing the rise on the surface feature from affecting the fabrication yield of the touch panel 20.

For better understanding, following embodiments provides a method for fabricating a touch panel, and the method includes following steps:

S1: providing a cover plate;
S2: forming a shielding layer; and
S3: forming a patterned first sensing structure.

Referring to FIG. 1, at step S1, the cover plate has and defines a visible area VA and a non-visible area NA, in which the non-visible area NA surrounds the visible area VA. Next, at step S2, the shielding layer 130 is formed in the non-visible area NA. As shown in FIG. 3, if the touch panel 10 is a structure of one-glass solution, the shielding layer 130 can be formed on the bottom surface 101 of the cover plate 100, and the first sensing structure 110 is formed on a part of the shielding layer 130 and the bottom surface 101 of the cover plate 100 corresponding to the visible area VA. As shown in FIG. 9, if the touch panel 20 is a structure of two layer of glass, the method for fabricating the touch panel 20 further includes providing a substrate 150. In addition, the step of forming the shielding layer 130 can further include forming the shielding layer 130 on the loading surface 151 of the substrate 150, and the first sensing structure 110 can be formed on a part of the shielding layer 130 and the loading surface 151 of the substrate 150 corresponding to the visible area VA.

In some embodiments, for example, the cover plate 100 can be transparent glass material, but it should not limit the present disclosure. The shielding layer 130 can be made of opaque materials, such as black resist, and the shielding layer 130 can be formed in the non-visible area NA by imprinting or coating, but it should not limit the present disclosure.

Figure 10:
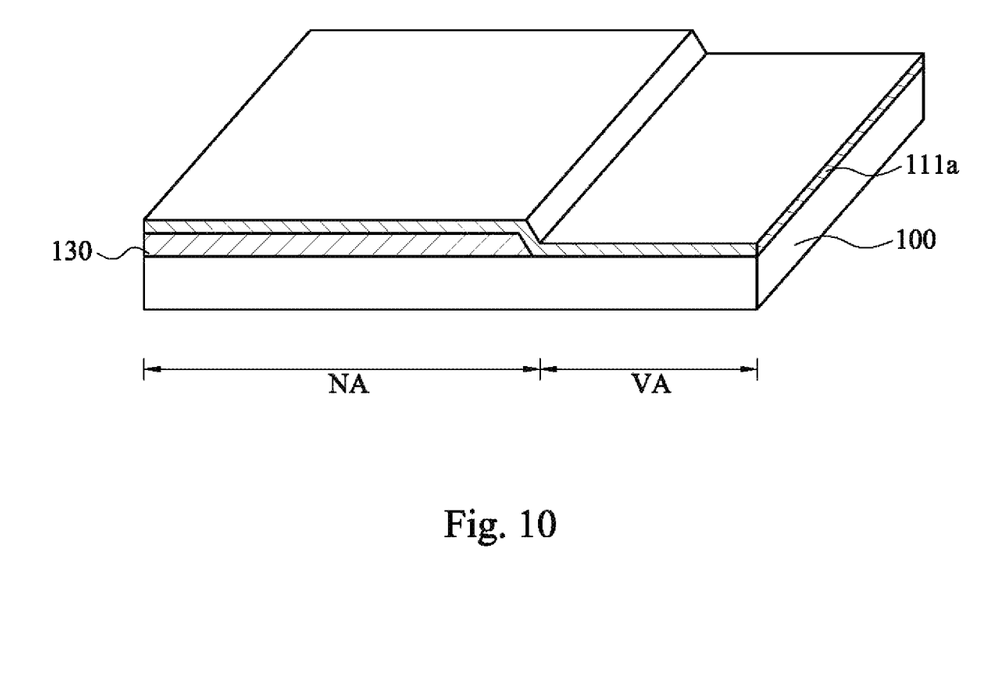
FIG. 10 to FIG. 12 are continuous schematic views of patterning a first sensing structure according to one or more embodiments of the present embodiments.
Figure 11:
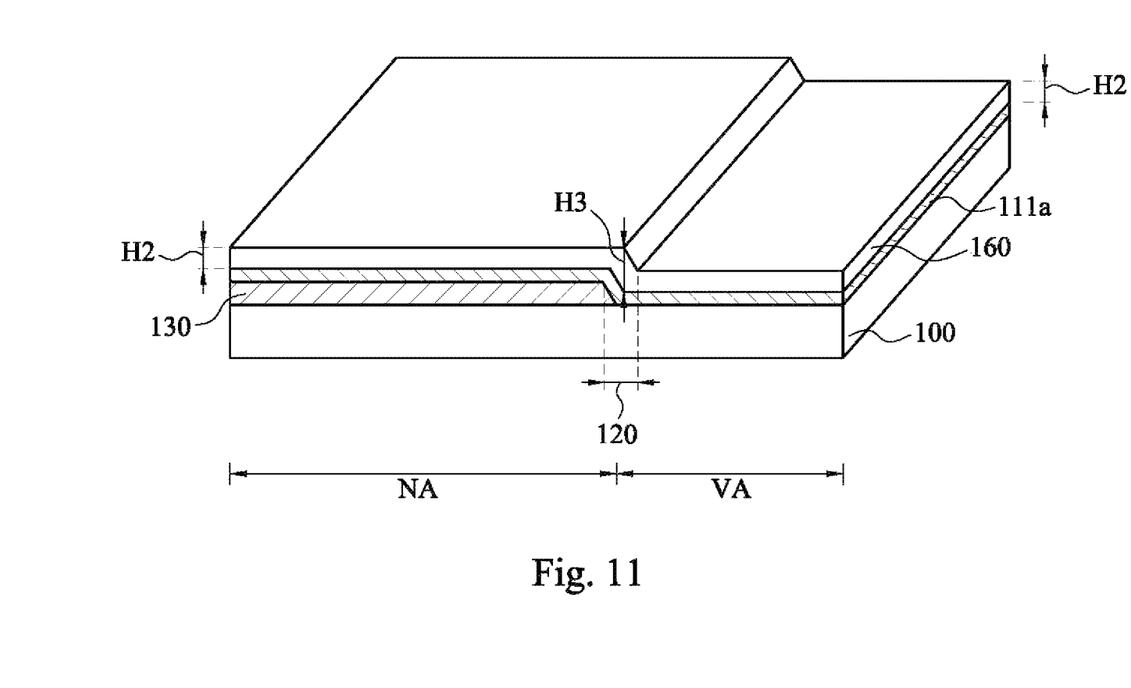
Figure 12:
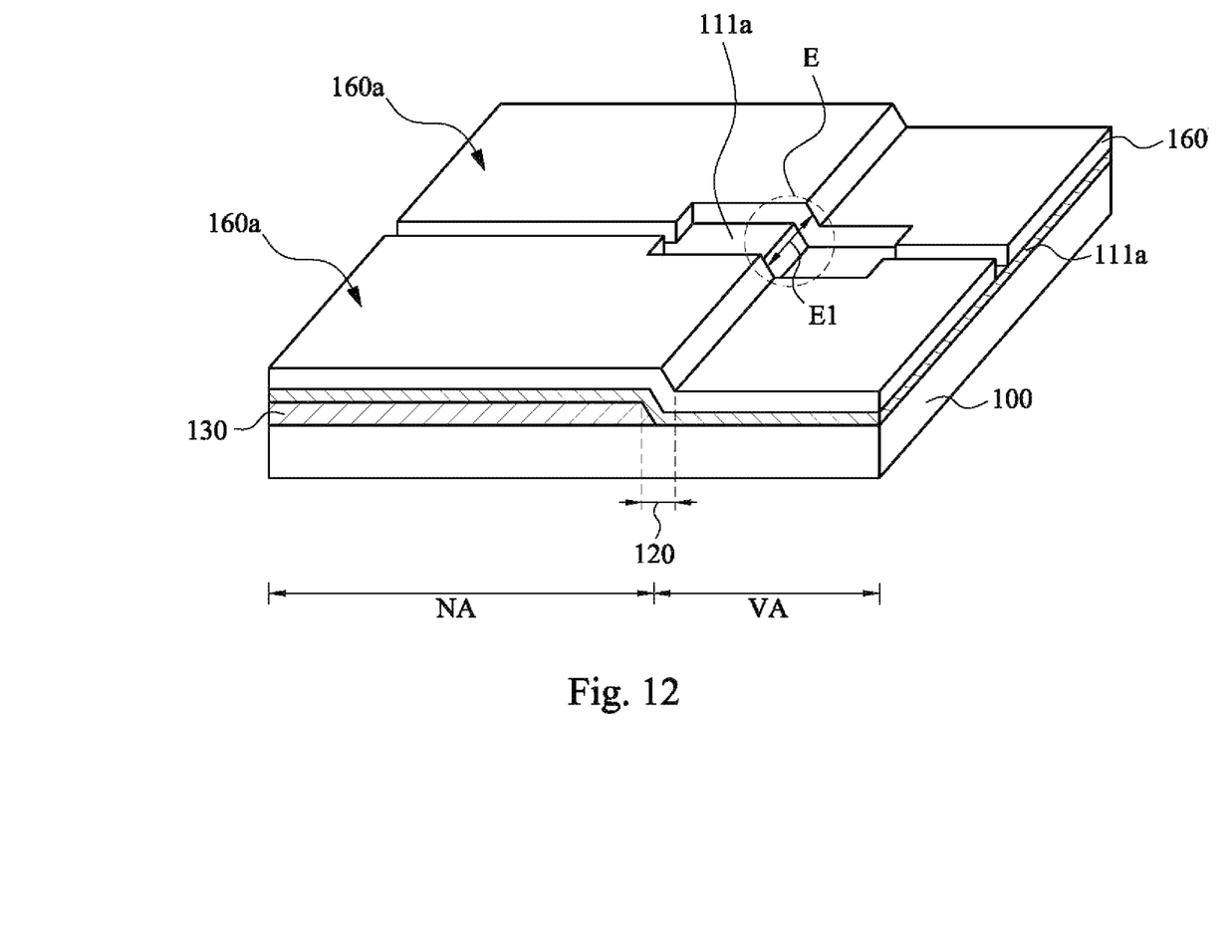

Referring to FIG. 2, at step S3, a patterned first sensing structure 110 can be formed in the visible area VA and at least the part of the non-visible area NA. To be specific, reference is made to FIG. 10 to FIG. 12, which depict continuous schematic views of patterning the first sensing structure, in which the position depicted by FIG. 10 to FIG. 12 is similar to the position of FIG. 3 to FIG. 4 in the fabrication process. As shown in figures, the step of patterning the first sensing structure 110 can further include:

S3.1: forming a first sensing electrode layer 111a in the visible area VA and at least the part of the non-visible area NA;
S3.2: coating a resist layer 160 on the first sensing electrode layer 111a;
S3.3: forming plural first sensing electrode patterns 160a of the resist layer 160 on the first sensing electrode layer 111a; and
S3.4: etching the first sensing electrode layer 111a by utilizing the first sensing electrode patterns 160a.

As shown in FIG. 10, at step S3.1, the first sensing electrode layer 111a covers a surface (which is the bottom surface 101 of FIG. 3) of the cover plate 100 corresponding to the visible area VA, and at least partially covers the shielding layer 130. The first sensing electrode layer 111a can be made of transparent conductive materials, such as Indium Tin Oxide (ITO) and Indium Zinc Oxide (IZO).

Next, as shown in FIG. 11, at step S3.2, the resist layer 160 can has a height H2 at a flat portion of the visible area VA or the non-visible area NA. The resist layer 160 can has a height H3 at the boundary portion 120 of the visible area VA and the non-visible area NA. Since the resist layer 160 is accumulated at the boundary portion 120 where a rise on the surface feature is located, the height H3 at the boundary portion 120 is greater than the height H2 at the flat portion, and therefore, in the following developing procedure, the resist layer 160 at boundary portion 120 is developed with an imperfection, and the underlying first sensing layer 111a is etched with an imperfection.

Next, as shown in FIG. 12, at step S3.3, plural first sensing electrode patterns 160a are formed by patterning the resist layer 160, such as the exposing and developing procedure. As shown in the figure, at the boundary portion 120, the first sensing electrode patterns 160a have a first etch compensation pitch E1 therebetween. To be specific, the value of the first etch compensation pitch E1 is a sum of the value of the second pitch D2 of FIG. 4 and a first compensation value. As a region E shown in FIG. 12, since there may be a remaining resist layer 160 that is not completely developed (particularly, between at the edge portion of the first etch compensation pitch E1 adjoining the first sensing electrode patterns 160a) at the boundary portion 120 between two adjacent first sensing electrode patterns 160a, therefore, the etching effect at the boundary portion 120 of the first sensing electrode layer 111a is worse. Therefore, in the embodiment of FIG. 12, by enlarging the distance between two adjacent first sensing electrode patterns 160a, in the subsequently etching the first sensing layer 111a, it can be prevented that the electrical short circuit is produced between two adjacent first sensing electrodes 111 due to the imperfection in the etch process.

In some embodiments, at the boundary portion 120, an edge of the shielding layer 130 can have a slope. The first compensation value is proportional to the slope of the edge of the shielding layer 130. To be specific, the shielding layer 130 refers to an incline of the shielding layer 130 close to the visible area VA, and the slope of the edge of the shielding layer 130 is the degree of the incline. That is, the greater the slope, the more serious the accumulation of the resist layer 160 at the edge of the shielding layer 130, and the greater the value of the first compensation value. In practical applications, the first etch compensation pitch E1 can be about 34 micrometers, in which the value of the second pitch can be about 30 micrometers, and the first compensation value can be about 4 micrometers, but it should not limit the scope of the present disclosure.

Next, reference is made to FIG. 3 and FIG. 12. At step S3.4, the plural patterned first sensing electrodes 111 can be formed by the first sensing electrode patterns 160a on the resist layer 160. From FIG. 12 and FIG. 4, it is known that due to the accumulation of the resist layer 160 at the boundary portion 120, at the boundary portion 120, the second pitch D2 between the two adjacent first sensing electrodes 111 would be smaller than the first etch compensation pitch E1.

In some embodiments, as shown in FIG. 5, in the non-visible area NA, an insulating layer is formed between the first sensing structure 110 and the shielding layer 130, in which the boundary portion 120 includes a range from an edge L1 of the shielding layer 130 to an edge L2 of the insulating layer.

Referring to FIG. 1, the step of forming a shielding layer 130 includes forming a hollow-out pattern 135. As shown in FIG. 1, the hollow-out pattern 135 can be a pattern of a return key or a pattern of home key. In some embodiments, the hollow-out pattern 135 can be formed by lithography process, but it should not limit the present disclosure.

Next, referring to FIG. 6. As shown in figure, in some embodiments, the method for fabricating the touch panel 10 can further include:

S4: forming a patterned second sensing electrode structure 140.

Figure 13:
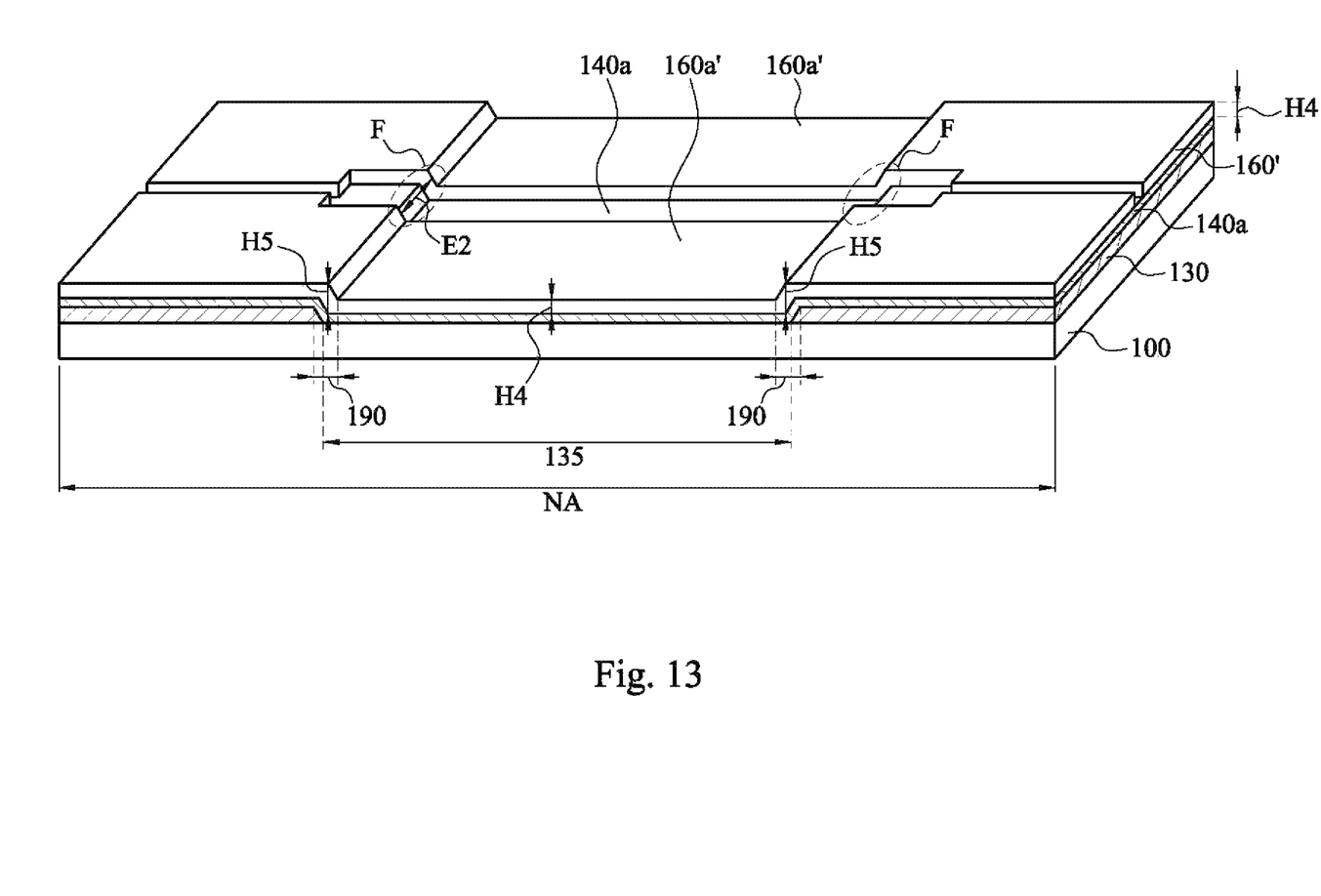
FIG. 13 is a schematic view of patterning a second sensing structure according to one or more embodiments of the present embodiments.

To be specific, referring to FIG. 13, which depicts a schematic view of patterning a second sensing structure 140. As shown in the figure, the step of patterning the second sensing structure 140 can further includes:

S 4.1: forming a second sensing electrode layer 140a in the non-visible area NA;

S 4.2: coating a resist layer 160' on the second sensing electrode layer 140a;

S 4.3: forming plural second sensing electrode patterns 160a' of the resist layer 160' on the second sensing electrode layer 140a; and S 4.4: etching the second sensing electrode layer 140a by utilizing the plural second sensing electrode patterns 160a'.

As shown in FIG. 13, at step S 4.1, the second sensing electrode layer 140 at least partially covers the hollow-out pattern 135. In some embodiments, the second sensing electrode layer 140a can be made of transparent conductive materials, such as Indium Tin Oxide (ITO) and Indium Zinc Oxide (IZO), and the second sensing electrode layer 140a and the first sensing electrode layer 111a can be formed by the same process.

At step S4.2, the resist layer 160' of FIG. 13 and the resist layer 160 of FIG. 11 can be formed by the same process. As shown in FIG. 13, the resist layer 160' has a height H4 at a flat portion in the hollow-out pattern 135 or out of the hollow-out pattern 135. The resist layer 160' can have a height H5 at the edge portion 190 of the hollow-out pattern 135. Since the resist layer 160' is accumulated at the edge portion 190 where a rise on the surface feature is located, the height H5 at the edge portion 190 is greater than the height H4 at the flat portion. Therefore, in the follow developing procedure, the resist layer 160' at the edge portion 190 is developed with an imperfection, and therefore the underlying second sensing layer 141a is etched with an imperfection.

As a result, as the step S 4.3, the second sensing electrode patterns 160a' can have a second compensation pitch E2 therebetween. To be specific, the value of the second etch compensation pitch E2 is a sum of the value of the fourth pitch D4 of FIG. 8 and the second compensation value. As shown in the region F in FIG. 13, at the etch portion 190, between two adjacent second sensing electrode patterns 160a', since there may be a remaining resist layer 160 that is not completely developed (particularly, between at the edge portion of the second etch compensation pitch E2 adjoining the second sensing electrode patterns 160a'), therefore, the etching effect of the second sensing electrode layer 140a is worse. As a result, in the embodiment of FIG. 13, by enlarging the distance between two adjacent second sensing electrode patterns 160a', it can be prevented that the electrical short circuit is produced between two adjacent second sensing electrodes 141 due to the imperfection in the subsequent etch process.

In some embodiments, at the etch portion 190, an edge of the shielding layer 130 can have a slope. The second compensation value is proportional to the slope of the edge of the shielding layer 130. In the practical applications, the second etch compensation pitch E2 can be about 34 micrometers, in which the value of the fourth pitch D4 can be about 30 micrometers, and the second compensation value can be about 4 micrometers, but it should not limit the scope of the present disclosure.

Next, at step S4.4, the plural patterned second sensing electrodes 141 can be formed by the corresponding second sensing electrode patterns 160a' of the resist layer 160'. From FIG. 13 and FIG. 8, it is known that due to the accumulation of the resist layer 160' at the etch portion 190, at the etch portion 190, the fourth pitch D4 between the two adjacent second sensing electrodes 141 would be smaller than the second etch compensation pitch E2.

In conclusion, the resist may accumulate at the changing position (such as the boundary portion and the edge portion) where the rise on the surface feature is located. As a result, in one or more embodiments of the present disclosure, at the changing position where the rise on the surface feature is located, the distance between two adjacent sensing electrodes (such as the first sensing electrodes and the second sensing electrode) is required to be greater than that at the flat portion, thereby reducing the possibility of electrical short circuits resulted from an imperfection in the etch process among the sensing electrodes (such as the first sensing electrodes and the second sensing electrodes), and increasing the fabrication yield of the touch panels.

Although the present disclosure has been described in considerable detail with reference to certain embodiments thereof, it should not limit the present disclosure. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A touch panel, comprising:
    a cover plate having a visible area and a non-visible area, wherein the non-visible area surrounds the visible area;
    a shielding layer configured to define the non-visible area;
    a first sensing structure comprising a plurality of first sensing electrodes, wherein the first sensing electrodes are disposed in the visible area and at least a part of the non-visible area, any two adjacent first sensing electrodes in the visible area have a first pitch therebetween, and any two adjacent first sensing electrodes at a boundary portion of the visible area and the non-visible area have a second pitch therebetween, wherein the second pitch is greater than the first pitch: and
    an insulating layer disposed in the non-visible area and formed between the first sensing structure and the shielding layer, wherein the boundary portion comprises a range from an edge of the shielding layer to an edge of the insulating layer.

2. The touch panel of claim 1, wherein the first sensing electrodes has a height difference between a surface of the first sensing electrodes in the visible area and a surface of the first sensing electrodes in the non-visible area.

3. The touch panel of claim 1, wherein the shielding layer comprises a hollow-out pattern, the touch panel further comprises a second sensing structure comprising a plurality of second sensing electrodes, the second sensing electrodes are disposed in the non-visible area and at least partially cover the hollow-out pattern, any two adjacent second sensing electrodes out of the hollow-out pattern have a third pitch therebetween, any two adjacent second sensing electrodes at an edge portion of the hollow-out pattern have a fourth pitch therebetween, wherein the fourth pitch is greater than the third pitch.

4. The touch panel of claim 3, wherein the second sensing electrodes has a height difference between a surface of the second sensing electrodes in the hollow-out pattern and a surface of the second sensing electrodes out of the hollow-out pattern.

5. The touch panel of claim 1, wherein the cover plate has a bottom surface, the shielding layer covers a part of the bottom surface to form the non-visible area of the cover plate, and the first sensing electrodes cover a part of the shielding layer and the bottom surface corresponding to the visible area.

6. The touch panel of claim 1, further comprising a substrate having a loading surface, wherein the loading surface faces a bottom surface of the cover plate, the shielding layer is disposed on a part of the loading surface to form the non-visible area of the cover plate, and the first sensing structure covers a part of the shielding layer and the loading surface corresponding to the visible area.

7. The touch panel of claim 1, further comprising at least one conductive line disposed in the non-visible area, wherein an end of one of the first sensing electrodes is electrically connected to the conductive line.

8. The touch panel of claim 1, wherein the boundary portion comprises a range extending a determined distance toward two opposite sides from a centerline, and an edge of the shielding layer is taken as the centerline.

9. The touch panel of claim 1, wherein the range of the boundary portion extends a determined distance in a normal direction of the edge of the shielding layer, or extends the determined distance in a normal direction of the edge of the insulating layer.

10. A method for fabricating a touch panel, comprising:
    providing a cover plate having a visible area and a non-visible area, wherein the non-visible area surrounds the visible area;
    forming a shielding layer configured to define the non-visible area of the cover plate;
    forming a patterned first sensing structure in the visible area and at least a part of the non-visible area, wherein the first sensing structure comprises a plurality of first sensing electrodes, any two adjacent first sensing electrodes in the visible area have a first pitch therebetween, and any two adjacent first sensing electrodes at a boundary portion of the visible area and the non-visible area have a second pitch therebetween, wherein the second pitch is greater than the first pitch: and
    forming an insulating layer between the first sensing structure and the shielding layer in the non-visible area, wherein the boundary portion comprises a range from an edge of the shielding layer to an edge of the insulating layer.

11. The method for fabricating the touch panel of claim 10, wherein the forming the patterned first sensing structure comprises:
    forming a first sensing electrode layer in the visible area and at least the part of the non-visible area, wherein the first sensing electrode layer at least partially covers the shielding layer;
    coating a resist layer on the first sensing electrode layer;
    forming a plurality of first sensing electrode patterns of the resist layer on the first sensing electrode layer, wherein the first sensing electrode patterns at the boundary portion have a first etch compensation pitch therebetween, and the value of the first etch compensation pitch equals to a sum of the value of the second pitch and a first compensation value; and
    etching the first sensing electrode layer by utilizing the first sensing electrode patterns to form a plurality of patterned first sensing electrodes.

12. The method for fabricating the touch panel of claim 11, wherein the first compensation value is about 4 micrometers.

13. The method for fabricating the touch panel of claim 11, wherein an edge of the shielding layer has a slope at the boundary portion, and the first compensation value is proportional to the slope.

14. The method for fabricating the touch panel of claim 10, wherein the forming the shielding layer further comprises:
    forming a hollow-out pattern;
    wherein the method for fabricating the touch panel further comprising:

forming a patterned second sensing structure comprising a plurality of second sensing electrodes, wherein the second sensing electrodes are disposed in the non-visible area and at least partially cover the hollow-out pattern, any two adjacent second sensing electrodes out of the hollow-out pattern have a third pitch therebetween, any two adjacent second sensing electrodes at an edge portion of the hollow-out pattern have a fourth pitch therebetween, wherein the fourth pitch is greater than the third pitch.

15. The method for fabricating the touch panel of claim 14, wherein the forming the patterned second sensing structure further comprises:
forming a second sensing electrode layer in the non-visible area, wherein the second sensing electrode layer at least partially covers the hollow-out pattern;
coating a resist layer on the second sensing electrode layer;
forming a plurality of second sensing electrode patterns of the resist layer on the second sensing electrode layer, wherein the second sensing electrode patterns crossing an edge portion of the hollow-out pattern have a second etch compensation pitch therebetween, and the value of the second etch compensation pitch equals to a sum of the value of the fourth pitch and a second compensation value; and
etching the second sensing electrode layer by utilizing the second sensing electrode patterns to form a plurality of patterned second sensing electrodes.

16. The method for fabricating the touch panel of claim 15, wherein the second compensation value is about 4 micrometers.

17. The method for fabricating the touch panel of claim 15, wherein an edge of the shielding layer has a slope at the edge portion of the hollow-out pattern, and the second compensation value is proportional to the slope.

18. The method for fabricating the touch panel of claim 10, wherein the forming the shielding layer further comprises:
forming the shielding layer on a part of a bottom surface of the cover plate;
wherein the forming the patterned first sensing structure further comprises:
forming the first sensing structure on a part of the shielding layer and the bottom surface of the cover plate corresponding to the visible area.

19. The method for fabricating the touch panel of claim 10, further comprising:
providing a substrate, wherein the substrate has a loading surface facing a bottom surface of the cover plate;
wherein the forming the shielding layer further comprises:
forming the shielding layer on a part of the loading surface;
wherein the forming the patterned first sensing structure further comprises:
forming the first sensing structure on a part of the shielding layer and the loading surface of the substrate corresponding to the visible area.

* * * * *